Patented Sept. 16, 1930

1,776,202

UNITED STATES PATENT OFFICE

NORMAN STRAFFORD AND ERIC EVERARD WALKER, OF BLACKLEY, MANCHESTER, ENGLAND, ASSIGNORS TO BRITISH DYESTUFFS CORPORATION LIMITED, OF MANCHESTER, ENGLAND

MANUFACTURE OF PHENOLIC RESINS

No Drawing. Application filed June 30, 1928, Serial No. 289,610, and in Great Britain July 7, 1927.

This invention relates to the purification of resinous phenol condensation products, by the removal of free phenol and incompletely polymerized phenolic bodies.

The resin or resinous condensation product is ground and mixed with a solvent, which, although dissolving free phenol, is substantially without action on the more highly polymerized condensation products. The resin may be ground and then extracted with the solvent. It is, however, essential that the resin should retain its finely divided state during the process of extraction.

We have found that it is particularly advantageous to incorporate the resin with an inert filler before carrying out the process of extraction. By this means the finely divided state of resin is much more readily maintained and thus facilitates the extraction. After extraction which may be carried out in a continuous manner or repeated as many times as is necessary to obtain the desired result, the resin may be extracted from the filler by means of a suitable solvent such as acetone or ethyl alcohol, or the resin and filler may be dried together and used as a moulding powder. The purified powder obtained by extraction may be treated with alcohol in a continuous extraction apparatus until substantially all of the resole has been removed from the inert filler. The solution is evaporated in vacuo at about 60° C. to any desired concentration. If desired evaporation in vacuo may be carried to dryness. The resole is thus obtained as a pulverulent powder containing 0.5 per cent or less of free phenol.

Suitable solvents for removing the free phenol and condensation products of low molecular weight are water, benzene and ether, and almost any inert filler may be used such as wood meal, wood pulp, cotton and other textile wastes, asbestos and other fibrous or cellular materials, and mineral fillers such as china clay, fuller's earth, etc.

Instead of being incorporated with a filler the resin may be spread on paper or fabric and after extraction of the phenolic impurities the sheets may be dried and pressed in known manner to form laminated products.

It is known already that the rate of hardening, stability, colour, colour fastness and other properties of phenol formaldehyde resoles are influenced to a great extent by the hydrogen ion concentration (see British Patent No. 259,046 to Walker, dated 9th April, 1925). By the term "resole" we mean the product obtained by the condensation of phenols with formaldehyde in the presence of alkalies, the said product being an intermediate condensation product which is fusible and which is capable, under suitable conditions, of being converted into an insoluble and infusible resin. The method of adjusting this hydrogen concentration which has been disclosed involves the intimate mixing of the liquid resoles with an aqueous layer whereby equilibrium between the two layers is established. This method of working imposes an upper limit on the viscosity of the liquid resole at the time the adjustment is made, for, if this is too high, intimate mixing cannot be accomplished or, if it is accomplished, the thick emulsion which is formed does not separate again into two layers. This is a great disadvantage.

We have now found that by mixing this liquid resole with a finely divided inert material such as wood meal, fuller's earth or china clay so that the resole is deposited on or incorporated with the inert material, and then suspending the admixture in water in a fine state of division (it may even be ground with water) the hydrogen ion concentration may be adjusted easily and rapidly by the addition of soluble acids or bases (or substances possessing an acidic or alkaline reaction) both in the presence or absence of substances possessing a buffer action. The adjustment of the hydrogen ion concentration may be carried out before, during or after the washing out of the free phenol, but we prefer to carry out the adjustment before purification because as the soluble materials are removed from the resin equilibrium between the aqueous medium and the resin takes place with increasing difficulty. Moreover, it is desirable (though not absolute necessary) to carry out the washing process with the pH lying between 3.5 and 7. If the pH is lower than 3.5 the resole is apt to be unstable, if it is higher than 7 the yield of purified material is apt to be low. Nevertheless, for some purposes it is desirable also to readjust the pH after the washing is complete. For instance, a sensitive moulding powder may be obtained which hardens very rapidly under the influence of heat by adjusting the pH to about 3.2 after the washing process is complete and then drying at a low temperature with great care. After washing the resin may be dissolved off the substratum, and the solution may be used as a lacquer or evaporated to dryness. Alternatively the powder may be separated from the water, dried and used as a moulding powder. Bodies modifying the physical condition, for instance the hardness, softness or the color of the resin, may be mixed with it before use if desired. To this end, catalysts (acidic or basic) plasticizers or pigments which are substantially insoluble in the solvent used for extraction may be added. These bodies have different specific effects but they all have a modifying action and hence are herein designated by the general term "modifying bodies".

Instead of using a powdered substratum, the resole may be spread in thin layers on sheets of paper, fabric or the like, or the sheets may be impregnated with the resin. The sheets may then be suspended in water for the adjustment of the pH and the removal of free phenols.

Our invention is illustrated, but not limited, by the following examples.

*Example 1.*—Equal parts by weight of wood meal and a solid phenol formaldehyde resole containing about 10 per cent free phenol and a somewhat larger proportion of other soluble phenolic materials of low molecular weight are milled together on warm incorporating rolls. When cold the intimate mixture of resin and wood meal thus obtained is finely ground and suspended in water. The pH is adjusted to 6 by the addition of dilute acid or alkali while stirring. The water is decanted off and the powder is washed three times with approximately eight times its weight of water. The pH may then be adjusted to any desired value. The powder which is now granular, free from tackiness and easily filtrable is separated from the water, dried in vacuo and is then ready for use. The phenol content of the purified powder is about 0.2 per cent. (The exact figure depends on the efficiency with which the washing process is carried out.) The wet powder may be then incorporated with plasticizers, colouring matters and hardening catalysts, or such of them as are not soluble in water may be added before the washing is carried out.

A similar result is obtained by using in place of wood meal about an equal weight of wood pulp, cotton and other textile wastes, asbestos or other fibrous or cellular material.

*Example 2.*—Wood meal is mixed with an alcoholic solution containing a weight of resole about equal to the weight of wood meal (the actual quantity of wood meal may vary over a wide range). The alcohol is removed by drying in vacuo at 60° C. The dry mixture is extracted with benzene in a continuous extraction apparatus. After 12 hours extraction the phenol content is reduced to about 0.5 per cent.

*Example 3.*—30 parts by weight of dry colloidal clay are mixed intimately with 50 parts of crude liquid resole (containing about 25 per cent–35 per cent of water). The mixture is stirred with 600 parts of water and allowed to settle for about 15 minutes. A portion of the clay remains in fine suspension and is decanted off. The process of washing is repeated a further four times, and the washed residue is filtered off and dried in vacuo. It contains about 90 per cent of purified resin (phenol content 0.5 per cent) and 10 per cent clay. The clay from the decanted washings may be recovered by filtration. Other mineral fillers, such as fuller's earth, kieselguhr etc. may be used but are less effective.

What we claim and desire to secure by Letters Patent is:—

1. Process for the manufacture of purified resinous condensation products of the phenol-aldehyde type which consists in mixing the unhardened, water-insoluble resole with a solid substratum and then removing phenols and soluble condensation products by extracting the mixture with a solvent.

2. Process for the manufacture of purified resinous condensation products of the phenol-aldehyde type which consists in mixing the unhardened, water-insoluble resole with a solid substratum and then removing phenols and soluble condensation products by extracting the mixture with water.

3. Process for the manufacture of purified resinous condensation products of the phenol-aldehyde type which consists in mixing the unhardened, water-insoluble resole with a solid substratum and then removing phenols and soluble condensation products by extracting the mixture with water, the hydrogen ion concentration of the water in equilibrium with the resole having been adjusted to a pH value between 3.5 and 7.0.

4. Process for the manufacture of purified resinous condensation products of the phenol-aldehyde type which consists in mixing the unhardened, water-insoluble resole with a solid substratum and then removing phenols and soluble condensation products by extracting the mixture with water, the hydrogen ion concentration of the water in equilibrium with the resole having been adjusted to a pH value of 6.0.

5. The process of claim 1 in which the substratum is wood meal.

6. In the manufacture of purified resinous condensation products of the phenol-aldehyde type, the process which comprises mixing an unhardened, water-insoluble resole with a solid substratum, extracting with a solvent the mixture of resole and substratum to remove phenols and soluble condensation products and then dissolving the said resole from the said substratum by means of a different solvent.

7. The process of claim 1 in which the resole contains a hardening catalyst which is substantially insoluble in the solvent used for extraction.

8. The process of claim 1 in which the resole contains an acid catalyst which is substantially insoluble in the solvent used for extraction.

9. The process of claim 6 in which the solvent used to dissolve the resole from the substratum is alcohol.

In testimony whereof we affix our signatures.

NORMAN STRAFFORD.
ERIC EVERARD WALKER.